United States Patent
Bailey et al.

(10) Patent No.: US 10,013,236 B2
(45) Date of Patent: Jul. 3, 2018

(54) REAL-TIME ADAPTIVE SPEED SCHEDULER

(71) Applicant: The Boeing Company, Chicago, IL (US)

(72) Inventors: Louis J. Bailey, Covington, WA (US);
Ryan D. Hale, Kent, WA (US);
Gregory T. Saccone, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 234 days.

(21) Appl. No.: 13/898,507

(22) Filed: May 21, 2013

(65) Prior Publication Data
US 2014/0257598 A1   Sep. 11, 2014

Related U.S. Application Data

(60) Provisional application No. 61/773,645, filed on Mar. 6, 2013.

(51) Int. Cl.
*G01C 23/00* (2006.01)
*G05D 1/00* (2006.01)
(Continued)

(52) U.S. Cl.
CPC ............... *G06F 7/00* (2013.01); *G05D 1/101* (2013.01); *G08G 5/0039* (2013.01);
(Continued)

(58) Field of Classification Search
CPC ...... G08G 5/003; G01C 21/14; G01C 23/005; Y02T 50/84
See application file for complete search history.

(56) References Cited

U.S. PATENT DOCUMENTS 4,750,127 A * 6/1988 Leslie et al. .................... 701/16
5,121,325 A * 6/1992 DeJonge ......................... 701/123
(Continued)

FOREIGN PATENT DOCUMENTS

| EP | 0637787 A1 | 2/1995 |
| EP | 2426567 A1 | 8/2011 |
| EP | 2492889 A2 | 2/2012 |

OTHER PUBLICATIONS

International Search Report and Written Opinion dated Mar. 7, 2014, Int'l Application No. PCT/US2013/072403 (PCT application corresponding to U.S. Appl. No. 13/898,507).
(Continued)

*Primary Examiner* — John Olszewski
*Assistant Examiner* — Tommy Worden
(74) *Attorney, Agent, or Firm* — Ostrager Chong Flaherty & Broitman P.C.

(57) ABSTRACT

A real-time adaptive speed scheduler that optimizes the control of an aircraft's speed and speed mode through the introduction of an advisory providing an optimized speed schedule for improved fuel efficiency and aircraft predictability. This system can also be deployed to improve flight efficiency and aircraft predictability in situations where time needs to be gained or lost, or air traffic needs to be sequenced. The real-time adaptive speed scheduler disclosed herein provides a datalink solution for loading directly into an aircraft's flight management system, for operation and display on a mobile device, as an advisory to an air traffic controller for instruction to the aircraft as a voice command, any authorized subscriber, and/or as an advisory to a dispatcher at an airline operations center.

15 Claims, 7 Drawing Sheets

(51) Int. Cl.
    *G05D 3/00*     (2006.01)
    *G06F 7/00*     (2006.01)
    *G06F 17/00*     (2006.01)
    *G05D 1/10*     (2006.01)
    *G08G 5/00*     (2006.01)

(52) U.S. Cl.
    CPC ......... *G08G 5/0043* (2013.01); *G08G 5/0052* (2013.01); *G08G 5/0013* (2013.01)

(56) References Cited

U.S. PATENT DOCUMENTS

| | | | |
|---|---|---|---|
| 5,408,413 A * | 4/1995 | Gonser et al. | 701/3 |
| 5,457,634 A * | 10/1995 | Chakravarty | 701/3 |
| 6,061,612 A * | 5/2000 | Sainthuile et al. | 701/7 |
| 6,266,610 B1 * | 7/2001 | Schultz et al. | 701/528 |
| 6,507,782 B1 | 1/2003 | Rumbo et al. | |
| 7,283,895 B2 | 10/2007 | Bouchet | |
| 7,366,591 B2 * | 4/2008 | Hartmann et al. | 701/4 |
| 7,818,118 B2 * | 10/2010 | Lvansson et al. | 701/465 |
| 7,904,213 B2 * | 3/2011 | Coulmeau | 701/3 |
| 8,010,267 B2 | 8/2011 | Klooster et al. | |
| 8,165,734 B2 * | 4/2012 | Wachenheim | G05D 1/0202 701/121 |
| 8,280,626 B2 * | 10/2012 | Klooster | G08G 5/0013 701/3 |
| 8,340,843 B2 | 12/2012 | Coulmeau et al. | |
| 8,352,169 B2 | 1/2013 | Coulmeau et al. | |
| 8,565,938 B2 * | 10/2013 | Coulmeau | G01C 21/20 701/120 |
| 8,600,588 B2 * | 12/2013 | Del Amo Blanco | G08G 5/0034 701/14 |
| 8,788,189 B2 * | 7/2014 | Polansky | G08G 5/003 701/121 |
| 2003/0093219 A1 * | 5/2003 | Schultz et al. | 701/202 |
| 2005/0283281 A1 * | 12/2005 | Hartmann et al. | 701/4 |
| 2006/0025898 A1 * | 2/2006 | Charles | G05D 1/0061 701/3 |
| 2008/0103646 A1 * | 5/2008 | Lucas et al. | 701/14 |
| 2008/0300738 A1 * | 12/2008 | Coulmeau et al. | 701/3 |
| 2009/0112454 A1 * | 4/2009 | Wachenheim | G05D 1/0676 701/121 |
| 2009/0259351 A1 * | 10/2009 | Wachenheim et al. | 701/7 |
| 2009/0259392 A1 * | 10/2009 | Berard et al. | 701/121 |
| 2010/0131125 A1 * | 5/2010 | Blanchon et al. | 701/3 |
| 2010/0198433 A1 * | 8/2010 | Fortier | G01C 23/00 701/14 |
| 2010/0324812 A1 * | 12/2010 | Sacle et al. | 701/206 |
| 2011/0077858 A1 * | 3/2011 | Coulmeau | G05D 1/101 701/465 |
| 2011/0118908 A1 * | 5/2011 | Boorman et al. | 701/14 |
| 2011/0137493 A1 * | 6/2011 | Dacre-Wright et al. | 701/3 |
| 2011/0270470 A1 * | 11/2011 | Svoboda et al. | 701/3 |
| 2012/0035841 A1 * | 2/2012 | Polansky et al. | 701/120 |
| 2012/0059535 A1 * | 3/2012 | Jackson et al. | 701/3 |
| 2012/0209515 A1 * | 8/2012 | Klooster | G08G 5/0013 701/439 |
| 2013/0006450 A1 * | 1/2013 | Del Amo Blanco | G08G 5/0034 701/14 |
| 2016/0055753 A1 * | 2/2016 | Jain | G01C 23/00 701/3 |
| 2016/0069688 A1 * | 3/2016 | Polansky | G05D 1/0005 701/3 |
| 2017/0249849 A1 * | 8/2017 | De Prins | G08G 5/0039 |

OTHER PUBLICATIONS

Torres et al., "Trajectory Management Driven by User Preferences", 2011 IEEE/AIAA 30th Digital Avionics Systems Conference (DASC); Oct. 16-20, 2011; Seattle, WA, USA.

* cited by examiner

| MOD | RTE 1 LEGS | | 2/18 |
|---|---|---|---|
| 013° | 42NM | .780 | /FL410 |
| EVIPI | | | |
| 009° | 100NM | ECON | /FL410 |
| ETMIT | | | |
| 009° | 123NM | .800 | /FL410 |
| OKLAP | | | |
| 357° | 67NM | ECON | /FL410 |
| UDKOL | | | |
| 356° | 6NM | .810 | /FL410 |
| UDBAR | | | |
| <ERASE | | | RTE DATA> |

FIG. 1

REAL-TIME ADAPTIVE SPEED SCHEDULER

RELATED PATENT APPLICATION

This application claims the benefit, under Title 35, United States Code, § 119(e), of U.S. Provisional Application No. 61/773,645 filed on Mar. 6, 2013.

BACKGROUND

The present disclosure relates generally to systems and methods for optimizing the speed schedule of an aircraft for improved fuel efficiency and aircraft predictability.

A flight management system (FMS) onboard an aircraft is a specialized computer system that automates a wide variety of in-flight tasks. A primary function of a FMS is in-flight management of the flight plan. Using various sensors to determine the aircraft's position and an autopilot system, the FMS can guide the aircraft in accordance with the flight plan. Typically an FMS comprises a navigation database that contains the elements from which the flight plan is constructed. Given the flight plan and the aircraft's position, the FMS calculates the course to follow. The pilot can follow this course manually or the autopilot can be set to follow the course.

The flight plan includes a vertical trajectory, a lateral trajectory, time, and a speed schedule to be followed by the aircraft with respective tolerances, enabling the aircraft to reach its destination. The calculations of the flight plans are based on the characteristics of the aircraft, on the data supplied by the crew and on the environment of the system. The positioning and guidance functions then collaborate in order to enable the aircraft to remain on the trajectories defined by the FMS. The trajectories to be followed are constructed from a succession of "waypoints" associated with various flight points, such as altitude, speed, time, modes, heading, and other points. The term "waypoint" encompasses any point of interest where the point is defined using two, three or four dimensions. A trajectory is constructed from a sequence of segments and curves linking the waypoints in pairs from the departure point to the destination point. A segment or series of segments may be constrained by one or more economic constraints (e.g., time, fuel, and/or cost or a combination thereof). Each segment or series of segments so constrained will be referred to herein as an economic constraint (EC) trajectory segment. The speed schedule represents the speed and speed mode that the aircraft should maintain over time as it flies along the flight trajectory.

In aeronautics, the quantities used to define speed are indicated airspeed, the calibrated airspeed, true airspeed and Mach number. The indicated airspeed (IAS) is the speed corresponding to the speed indicated on the onboard instruments. The calibrated airspeed (CAS) corresponds to the speed after correction is applied to the IAS. The true airspeed (TAS) is the speed relative to the air mass the aircraft is traversing. The Mach number is the ratio of speed to the speed of sound. The value representing speed in a speed schedule can be defined as any of these speeds or can also be a groundspeed. If the time constraint is bound to an Earth-referenced point, the meeting of a time constraint is dependent on any of these speeds translated to a groundspeed, aircraft performance limitations and available distance. The groundspeed is the horizontal component of the speed of the aircraft relative to the ground. More precisely, the groundspeed is equal to the magnitude of the vector sum of the air speed and the wind speed projected onto the horizontal plane. The speed of the aircraft is the vector consisting of the vertical speed and the ground speed of the aircraft.

It is often desirable that the aircraft reach a particular point along the flight path having optimized fuel, cost, and time. Often these three parameters are in conflict with each other, especially in the case when one parameter is specified as a higher priority; yet, no matter which constraint (time, fuel, or cost) has priority, the solution needs to be optimized across the three constraints. Time, fuel and cost are herein referred to as "economic constraints". An economic constraint can be any one of or a combination of time, fuel and cost constraints. One example of prioritizing economic constraints is the following: if a point has a required or scheduled time constraint associated with it, the optimized solution to reach that point, at the designated time, should still attempt to minimize the fuel and cost. This example might reflect a situation wherein aircraft are being sequenced for arrival at an airport. In yet another example where time is not a constraint, an airline is concerned primarily with restricting costs associated with crew and fuel fees, giving cost a higher priority over other constraints. The solution, in this example, would be to minimize cost to the greatest extent possible but still consider keeping the aircraft on its scheduled arrival time at the destination.

There are multiple ways to alter the aircraft's speed schedule to reach a particular point, such as manipulation of the throttles, yoke, flight plan, economic parameters (cost index, fuel flow factors, and performance factors), speed constraints, speed transitions, speed restrictions or speed modes. This introduces a need for a method and system that can optimally alter the speed schedule of an aircraft along a flight trajectory. This need arises from the ongoing increase in air traffic and the corresponding workload for air traffic controllers and airline operating costs.

In the interest of increased safety and improved airspace or airspace capacity, time constraints are imposed on the aircraft during all flight phases (e.g., departure, climb, cruise, descent and airport approach). This ensures that aircraft arrive at a particular point in their flight plan at a controlled arrival time, scheduled time, constrained time or required time of arrival (hereinafter "RTA"). For example, an RTA waypoint may be a landing runway threshold, an air traffic convergence point, crossing points, etc. Ensuring an aircraft arrives at an RTA waypoint on time may make it possible, for example, to smooth the flow of aircraft before the approach phase and maintain a desired spacing between aircraft.

In the interest of increased economic viability, fuel and cost constraints may be imposed on a portion or all of a flight's trajectory without imposing time constraints. One example of this could be wherein an airline wants to minimize costs or fuel burned for a portion of the flight and air traffic control does not require a time constraint. In this example, an aircraft is provided a speed schedule that meets a cost constraint. Another example is when an air traffic controller is presented with flight trajectory predictions (e.g. estimated flight path, fuel, speed, altitude, and time) which identify that the economic constraints will be met if the flight holds true to the predictions. Should the flight deviate from the flight predictions by more than a predetermined tolerance, an economic constraint with respect to an RTA point could be imposed by the airline or air traffic controller.

The FMS calculates estimated fuel and estimated time of arrival (hereinafter "ETA") at the RTA waypoint, i.e., the time at which the FMS predicts that the aircraft will arrive at the RTA waypoint. If the ETA departs from the RTA by more than a predetermined tolerance, a new speed command takes place, causing the FMS to redefine the trajectory to be followed by taking account of the time constraint to be observed. The aim is to have the ETA converge with the RTA within a configurable time tolerance (e.g., ±15 seconds). This is accomplished by changing the speed of the aircraft.

Performance optimization allows the FMS to determine the best or most economical speed to fly. This is often called the ECON speed and the corresponding economy speed mode maintains the economy speed. The aircraft's speed while in the economy speed mode is based on an economic optimization criterion called the cost index, the weight of the aircraft, its altitude, wind and the ambient temperature. The cost index is an optimization criterion defined by the ratio of the costs of time and the costs of fuel. As a variant, the optimization criterion may take into account other costs, such as nuisance costs (noises, polluting emissions, etc.).

Current aircraft operations typically employ an RTA function or a fixed speed solution that is commanded to be performed "now". While an RTA function is active, the aircraft speed will fluctuate as new estimated time predictions are made as a result of groundspeed changes. The groundspeed fluctuates with changes in wind speed. As the aircraft speed fluctuates, the thrust will vary respectively. The RTA functions implemented in today's flight management systems are limited in the current and envisioned mid-term (next 25 years) to a single RTA function capability. The RTA function assigns and allows control to only one waypoint in the flight plan. There is an airline and air traffic operational preference to assign and control to multiple RTAs.

Additionally, some air traffic controllers and pilots are reluctant to assign an RTA to an aircraft or fly the RTA function. The air traffic controllers' reluctance is due, in part, to a potential loss of aircraft separation. In an area where procedural separation is used, such as when aircraft are flying over oceans, a variable speed is unacceptable for separation assurance. During procedural separation, knowledge of the speed, distance, and time (within specified error tolerances) is relied upon for ensuring separation. Also, if the aircraft speed varies, this would require a greater separation distance, which equates to a loss of airspace efficiency. This airspace inefficiency is a loss of airspace capacity, which translates to fewer aircraft in a given amount of airspace. Air traffic controllers may also be reluctant if they are unsure where the RTA mode would be executed and what characteristics the aircraft would follow before and after the RTA waypoint. The pilot's reluctance is due, in part, to the unpredictable nature of the RTA algorithms implemented by the multitude of flight management system manufacturers, each having its own unique behavioral characteristics. The pilots are also sensitive to how the RTA functions in relation to the performance limitations of the aircraft and passenger comfort.

In other instances, air traffic controllers provide a fixed speed command. The fixed speed solution overcomes most of the limitations of the RTA function, but is not optimized for fuel efficiency, is delivered via voice command, is applicable to a single waypoint, and does not provide an automated datalink solution. The fixed speeds are generated to be performed as "now" instructions, which does allow an aircraft to regain the time difference but does not consider optimization, the speed mode or resuming the economy speed mode when the constraint no longer exists. In addition, the use of a fixed speed command inherits delay in communication and time for the pilot and/or the aircraft to reach the specific speed. The controller would then have to "time" delivery of the speed instruction with these limitations in mind to achieve the desired results. Assuming the aircraft is still in the controller's sector, another voice command would have to be given for the aircraft to resume the previous speed and/or speed mode.

There is a need for systems and methods for optimally controlling the speed and speed mode of an aircraft that provide the advantages of the fixed and economy speed and speed modes and avoid the disadvantages of the RTA function.

SUMMARY

The subject matter disclosed herein is a real-time adaptive speed scheduler that optimizes the control of an aircraft's speed and speed mode through the introduction of an advisory providing an optimized speed schedule for improved fuel efficiency and aircraft predictability. This system can also be deployed to improve fuel efficiency and aircraft predictability in situations where time needs to be gained or lost, or air traffic needs to be sequenced. The real-time adaptive speed scheduler disclosed herein provides a solution for loading directly into an aircraft's FMS via datalink, operation and display on a mobile device, as an advisory to the flight crew or to an air traffic controller for instruction to the aircraft as a voice or datalink command, and/or as an advisory to a dispatcher at an airline operations center.

One aspect of the subject matter disclosed herein is a method, performed by a computer system, for determining a speed schedule, comprising: (a) obtaining or calculating information concerning at least one EC trajectory segment of a flight trajectory of an aircraft, the information comprising a current location of the aircraft, a current speed schedule of the aircraft, flight parameters, aircraft performance data, current and forecast weather conditions along the flight trajectory, and one or more economic constraints applicable to a first EC waypoint of the flight trajectory; (b); for said first EC waypoint, calculating estimated values for one or more economic factors corresponding to the one or more economic constraints applicable to the first EC waypoint based on said information; (c) calculating a respective difference between each economic constraint applicable to the first EC waypoint and the respective estimated value for the corresponding economic factor; (d) calculating a first portion of a speed schedule optimized to be flown by the aircraft along a first EC trajectory segment of the flight trajectory that terminates at the first EC waypoint, wherein the first portion of the speed schedule is calculated to eliminate or reduce said respective differences within a configurable tolerance in accordance with user configuration data; and (e) constructing a speed schedule advisory comprising an instruction to fly at speeds and in speed modes along the first EC trajectory segment of the flight trajectory in accordance with the first portion of the speed schedule. Optionally, the speed schedule advisory further comprises an instruction to revert to the economic speed mode following the first EC waypoint. The first speed schedule can be optimized to minimize one or more of cost, time and fuel.

In accordance with a further aspect, the foregoing method may further comprise: calculating updated values for the one or more economic factors at the first EC waypoint based on the aircraft flying along the first EC trajectory segment in accordance with the first speed schedule; obtaining or calculating a second economic constraint applicable to a second EC waypoint of the flight trajectory, the second EC waypoint being located downstream from the first EC waypoint; for the second EC waypoint, calculating estimated values for one or more economic factors corresponding to the one or more economic constraints applicable to the second EC waypoint based on the information; calculating a respective difference between each economic constraint applicable to the second EC waypoint and the respective estimated value for the corresponding economic factor; and calculating a second portion of the speed schedule optimized to be flown by the aircraft along a second EC trajectory segment of the flight trajectory that starts after the first EC waypoint and terminates at the second EC waypoint, wherein the second portion of the speed schedule is calculated to eliminate or reduce the respective differences within a configurable tolerance in accordance with the user configuration data. In this case, the speed schedule advisory further comprises an instruction to fly at speeds and in speed modes along the second EC trajectory segment of the flight trajectory in accordance with the second portion of the speed schedule.

Another aspect of the subject matter disclosed herein is a system for issuing a speed schedule as one or multiple advisories, that system comprising a computer system programmed to perform the operations described in the preceding two paragraphs.

Each speed schedule can be optimized to minimize cost, time or fuel. In one example of optimizing for time, the aircraft could be instructed to regain the ETA versus RTA time difference immediately due to other constraints. In an example of fuel optimization, the speed schedule is calculated as a function of the current and predicted economy speed, economy speed mode, flight segments, flight information, subscriber preferences and EC trajectory segment.

A further aspect of the subject matter disclosed herein is a method, performed by a computer system, for determining a speed schedule, comprising: (a) obtaining or calculating information concerning at least one EC trajectory segment of a flight trajectory of an aircraft that is flying in an economic speed mode, the information comprising a current location of the aircraft, a current speed schedule of the aircraft, flight parameters, aircraft performance data, current and forecast weather conditions along the flight trajectory, and one or more economic constraints applicable to a first EC waypoint of the flight trajectory; (b) for the first EC waypoint, calculating estimated values for one or more economic factors corresponding to the one or more economic constraints applicable to the first EC waypoint based on the information; (c) calculating a respective difference between each economic constraint applicable to the first EC waypoint and the respective estimated value for the corresponding economic factor; (d) calculating a speed schedule optimized to be flown by the aircraft along an EC trajectory segment of the flight trajectory that starts at a second EC waypoint not included in the flight trajectory and terminates at the first EC waypoint, wherein the speed schedule is calculated to eliminate or reduce the respective differences within a configurable tolerance in accordance with user configuration data; and (e) constructing a speed schedule advisory comprising an instruction to fly at speeds and in speed modes along the EC trajectory segment of the flight trajectory in accordance with the speed schedule.

Yet another aspect of the subject matter disclosed herein is a system for issuing a speed schedule as one or multiple advisories, that system comprising a computer system programmed to perform the operations described in the preceding paragraph.

Other aspects are disclosed in detail below.

BRIEF DESCRIPTION OF THE DRAWINGS

FIG. 1 is a diagram showing an example of a speed schedule sent as a speed and speed mode advisory via a data message to an aircraft.

Reference will hereinafter be made to the drawings in which similar elements in different drawings bear the same reference numerals.

DETAILED DESCRIPTION

Figure 2:
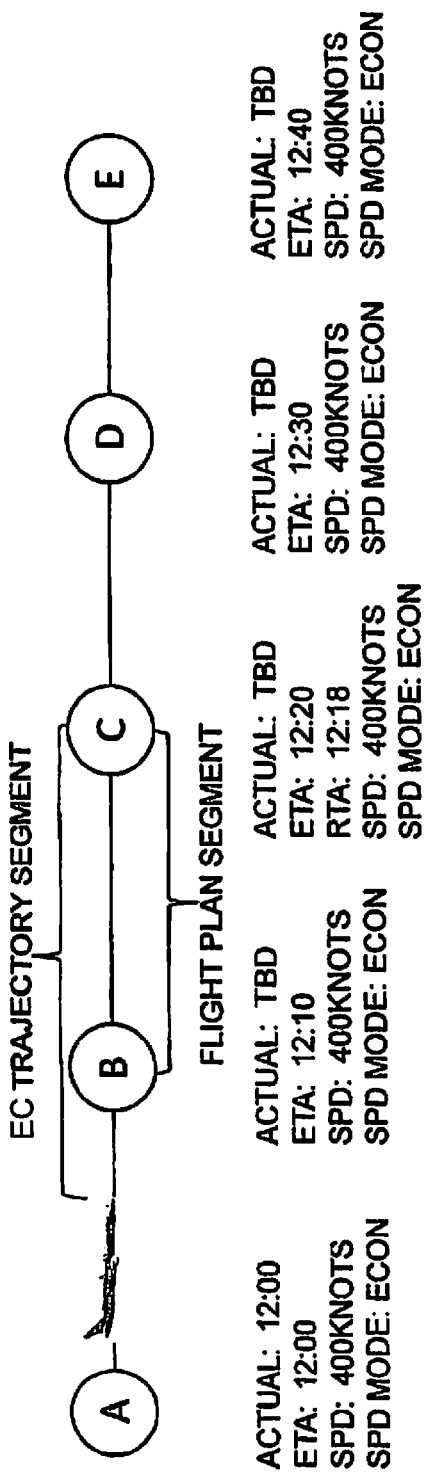
FIG. 2 is a diagram representing a speed schedule provided by a real-time adaptive speed scheduler to meet an RTA for an aircraft that is flying with an economy speed and economy speed mode. The flight trajectory of the aircraft passes through a series of flight plan waypoints (also referred to herein as "RTA waypoints") respectively labeled A through E.

The following description refers to various processes that are executed by one or more processors. These processes take the form of software running on one or more computers. It should be appreciated that each disclosed process can be executed by a respective processor or all processes can be executed by one processor or all processes can be executed by more than one processor or any combination therebetween.

In accordance with one embodiment, the real-time adaptive speed scheduler is a specialized computer system which is programmed to provide advisories to either a particular aircraft, air traffic control, a dispatcher, airline operations center or authorized subscriber for recommendations of a speed schedule for that particular aircraft. The speed schedule advisory comprises instructions concerning at least one of the speed, or speed mode and/or positioning of the speed schedule instruction, where position relates to a time, geospatial point, altitude, or flight event. The speed schedule advisory is optimized for fuel, time or cost efficiency and still meets the time constraints being levied on a flight. The speed schedule advisories can be automatically provided as datalink instructions transmitted by the real-time adaptive speed scheduler for loading either automatically or by the flight crew into the aircraft's flight management system, to a mobile device, as an annunciation/instruction to an aircraft traffic controller, a dispatcher at an airline operations center, or any authorized subscriber. The speed schedule advisory may be sent as either a voice or data advisory for instruction to a flight crew of the subject aircraft.

FIG. 1 shows a modification to a flight plan which illustrates the basic concept of the real-time adaptive speed scheduler system. In this particular example, page 2 of an 18-page flight plan is shown. This page represents a speed schedule advisory that has been sent to an aircraft as a speed schedule comprised of a speed and speed mode via a data message. In this example, the real-time adaptive speed scheduler has provided an advisory message instructing to fly a combination of speeds and speed modes to meet multiple time constraints.

Traversing through the particular leg of the flight plan shown in FIG. 1, the aircraft is instructed to control pitch, lateral direction and thrust to fly with a course of 13° at an altitude of 41,000 feet for 42 nautical miles to waypoint EVIPI, at which the aircraft changes the speed mode and air speed to achieve the air speed 0.780 Mach. For one type of aircraft, the speed schedule shown in FIG. 1 is understood to mean that the aircraft will be flying at the instructed speed of 0.780 Mach when it arrives at waypoint EVIPI. For other types of aircraft, the speed schedule shown in FIG. 1 is understood to mean that the aircraft will start to accelerate toward the instructed speed of 0.780 Mach when it arrives at waypoint EVIPI, meaning that the instructed speed of 0.780 Mach will not be achieved until some time after the aircraft arrives at waypoint EVIPI.

Next the aircraft is instructed to fly from waypoint EVIPI with a course of 9° at an altitude of 41,000 feet for 100 nautical miles at the instructed air speed of 0.780 Mach. At waypoint ETMIT, the aircraft will revert to the economy speed and fly the economy speed mode for 123 nautical miles (with a course of 9° at an altitude of 41,000 feet). In the economy speed mode, the aircraft's speed varies over that particular flight plan segment as fuel is burned, reducing the aircraft's gross weight.

When the aircraft reaches waypoint OKLAP, the aircraft is instructed to change the speed mode and air speed to achieve the air speed 0.800 Mach, flying with a course of 357° at an altitude of 41,000 feet at an instructed air speed of 0.800 Mach to reach OKLAP in 67 nautical miles. Again, for some types of aircraft, the speed schedule shown in FIG. 1 is understood to mean that the aircraft will be flying at the instructed air speed of 0.800 Mach when it arrives at waypoint OKLAP. For other types of aircraft, the speed schedule shown in FIG. 1 is understood to mean that the aircraft will start to accelerate toward the instructed speed of 0.800 Mach when it arrives at waypoint OKLAP, meaning that the instructed speed of 0.800 Mach will not be achieved until some time after the aircraft arrives at waypoint OKLAP.

When the aircraft arrives at waypoint UDKOL, the speed schedule advisory shown in FIG. 1 indicates that the aircraft will again revert to the economy speed and economy speed mode. The aircraft is instructed to fly the economy speed and economy speed mode with a course of 356° at an altitude of 41,000 feet for 6 nautical miles, which wilt bring the aircraft to waypoint UDBAR. At waypoint UDBAR, the speed schedule indicates that the aircraft to change the air speed and speed mode to achieve an air speed of 0.810 Mach.

As shown in FIG. 1, the real-time adaptive speed scheduler can provide speed and speed mode instructions corresponding to multiple points along a flight trajectory. In particular, the real-time adaptive speed scheduler can provide speed and speed mode instructions that will enable that aircraft to optimally meet a multiplicity of time constraints along its flight trajectory. For example, in a case where the aircraft's flight trajectory passes through waypoints A through F in sequence, the speed scheduler may issue an advisory that will enable the aircraft to satisfy respective RTAs at waypoints (i.e., RTA waypoints) B, D and F.

In the example shown in FIG. 1, the real-time adaptive speed scheduler provided speed and speed mode instructions to be executed at various geospatial points. In accordance with alternative embodiments, the real-time adaptive speed scheduler can provide these instructions based on a specified time in the flight trajectory, an event in a flight such as reaching the top of climb, or at a specified altitude. The real-time adaptive speed scheduler is not bound to the limitation of providing the advisory based on a geospatial point.

FIG. 2 is a diagram representing a speed schedule for an aircraft that is flying in an economy speed mode. The flight trajectory of the aircraft passes through a series of waypoints respectively labeled A through E. A respective list of parameters appears under each waypoint A through E in FIG. 2. Each list of parameters includes the following information: the actual time when the aircraft arrived at the respective waypoint (future arrival times are indicated by the entry "TBD", which stands for "to be determined"); the ETA of the aircraft at each particular waypoint; the planned speed of the aircraft at each waypoint (in this example, 400 knots); and the planned speed mode of the aircraft at each waypoint (i.e., the economy (ECON) speed mode). In addition, the list below waypoint C in FIG. 2 also includes an RTA of the aircraft at waypoint C. In the particular scenario depicted in FIG. 2, the aircraft is flying in the economy speed mode and is estimated to arrive at waypoint C at 12:20, while the RTA is 12:18, meaning that the aircraft will need to increase its air speed, which increases the groundspeed, above 400 knots before reaching waypoint C in order to meet the RTA constraint.

The scenario depicted in FIG. 2 identifies a situation where the real-time adaptive speed scheduler would be beneficial. Based on the current and planned speeds seen in FIG. 2, the aircraft is expected to cross the waypoints A through E 10 minutes apart and at an air speed of 400 knots while in the economy (ECON) speed mode. (For the sake of simplicity, it is assumed that the air speed will not vary significantly during the 40-minute time span depicted in FIG. 2, while in the ECON speed mode.) At waypoint C a time constraint has been introduced. The time constraint could be the result of a scheduled time of arrival determined by the airline, traffic, weather, or traffic sequencing. For the purpose of simplicity, all these time constraints are overly simplified by categorizing them as an RTA. In the scenario depicted in FIG. 2, an RTA is placed on waypoint C with a value of 12:18. With a 2-minute difference in the ETA and the RTA, the real-time adaptive speed scheduler provides a speed schedule advisory to remove the time difference and maintain fuel and cost optimization. To accomplish this, the real-time adaptive speed scheduler algorithms would evaluate various methods for removing the time difference based on the given or known inputs. In addition to the inputs of flight parameters of flight plan, flight intent, aircraft speed, economy parameters (cost index, costs, fuel burn rates, speed modes), altitude, and current and forecasted weather are aircraft performance parameters (limitations, accelerations, decelerations, limits, etc), aircraft equipage, and airspace capabilities.

Figure 3:
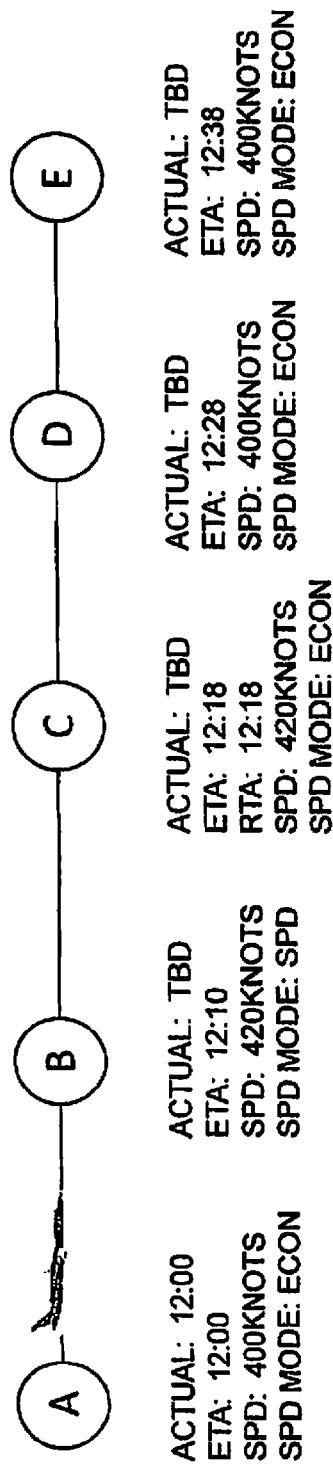
FIG. 3 is a diagram representing a speed schedule provided by a real-time adaptive speed scheduler in accordance with one embodiment in which the aircraft is instructed to start to accelerate at waypoint B until a speed of 420 knots is attained and change to a speed mode of Speed (SPD) from a speed mode of ECON at waypoint B for the purpose of making up a difference between the ETA and RTA at waypoint C, and then resume the ECON speed mode at waypoint C.

FIG. 3 is a diagram representing a flight trajectory of an aircraft that will fly in accordance with a speed schedule advisory provided by a real-time adaptive speed scheduler. In this instance, the real-time adaptive speed scheduler has calculated the optimum speed and speed mode given a situation where the aircraft can accept an uplink message but cannot accept a waypoint entry. With this limitation, the real-time adaptive speed scheduler will first determine that waypoints A and B are available to modify the aircraft's speed schedule to arrive at waypoint C sooner, i.e., at 12:18. The real-time adaptive speed scheduler executes an optimization algorithm that determines, given the EC trajectory segment and the flight plan segment distance between waypoints B and C, the weather conditions (including temperature, wind speed and direction), flight parameters, aircraft performance, etc, and the time to be gained, i.e., 2 minutes, that the 2-minute difference can be made up if the aircraft were to change the speed and speed mode at waypoint B and start to accelerate at waypoint B until an air speed of 420 knots is achieved. Accordingly, the real-time adaptive speed scheduler sends a speed schedule advisory to the aircraft instructing it to start to accelerate at waypoint B until an air speed of 420 knots is attained and change the speed mode at waypoint B for the purpose of making up the 2-minute difference between the ETA and RTA at waypoint C.

To complete the instruction of the speed schedule, the real-time adaptive speed scheduler would also instruct the aircraft to revert to an economy speed and economy speed mode when it arrives at waypoint C. In the economy speed mode, the original air speed of 400 knots will be restored soon after waypoint C. If the instruction to resume the economy speed mode was not provided, the speed and speed mode would remain unchanged and the aircraft would remain flying at 420 knots continuing along its flight trajectory to waypoints D and E. It should be noted that in some systems when a specific air speed is instructed (e.g., 420 knots at waypoint B), the speed mode defaults to a speed mode to immediately command the new air speed; however, the default conditions do not include an instruction to revert back to the ECON speed mode at waypoint C. In other words, the aircraft must be instructed to revert to the ECON speed mode. The real-time adaptive speed scheduler has knowledge of such default conditions and applies them in the advisory it constructs for delivery to the aircraft's FMS or to a mobile device.

Figure 4:
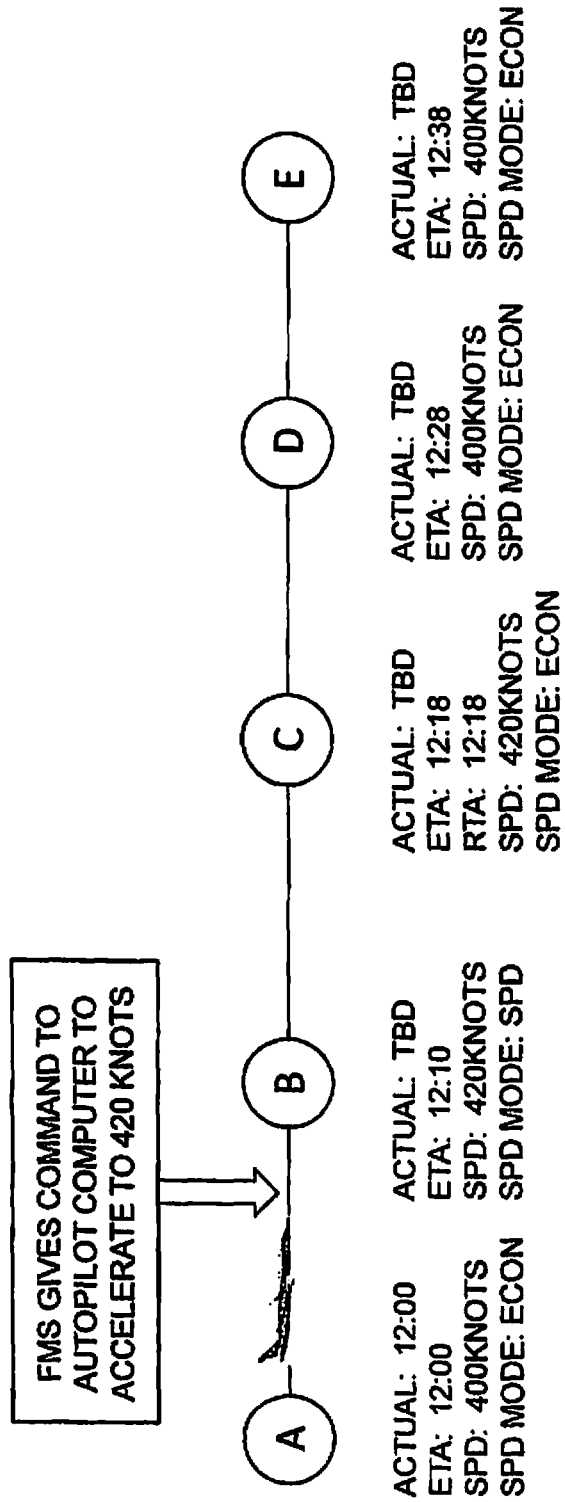
FIG. 4 is a diagram representing a speed schedule provided by a real-time adaptive speed scheduler in accordance with another embodiment in which the aircraft is instructed to adjust its speed so that it will have a speed of 420 knots at waypoint B and change to a speed mode of Speed (SPD) at waypoint B for the purpose of making up a difference between the ETA and RTA at waypoint C, and then resume the ECON speed mode at waypoint C.

FIG. 4 is a diagram representing a speed schedule provided by a real-time adaptive speed scheduler in accordance with another embodiment in which the aircraft has been instructed to adjust its speed mode and speed so that it will already be flying at an air speed of 420 knots when it arrives at waypoint B for the purpose of making up a difference between the ETA and RTA at waypoint C, and then resume the ECON speed mode at waypoint C. In this example, the FMS gives a command to the autopilot computer to start to accelerate at a geospatial point located between waypoints A and B. That geospatial point is calculated so that by the time the aircraft arrives at waypoint B, its speed will have increased from 400 knots to 420 knots. The target speed is calculated based on the distance separating waypoints B and C, the current aircraft altitude, drag coefficient, and aircraft acceleration rate and the time difference between the ETA and the RTA that would have existed at waypoint C in the absence of this increase in speed.

In the examples depicted in FIGS. 3 and 4, it was assumed that the aircraft can accept a data communication message but cannot accept a waypoint entry. A further option will now be described which assumes that there is no waypoint entry or aircraft equipage limitation to prevent the real-time adaptive speed scheduler from issuing a speed schedule advisory that includes the entry of a new waypoint along the planned flight trajectory.

Figure 5:
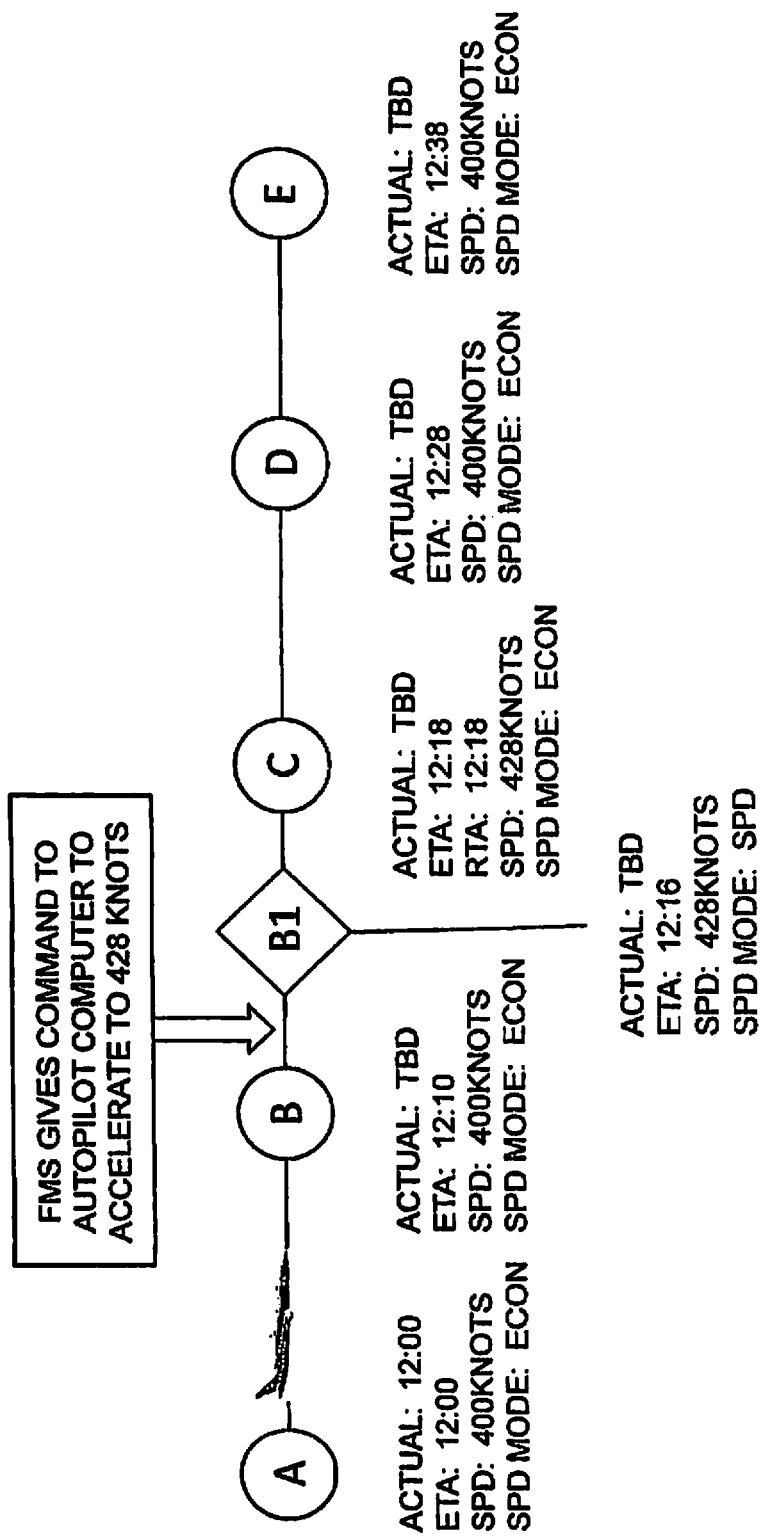
FIG. 5 is a diagram representing a speed schedule provided by a real-time adaptive speed scheduler in accordance with another embodiment in which the aircraft is instructed to adjust its speed so that it will have a fixed speed of 428 knots at a new waypoint B1 (located between waypoints B and C) and change to a fixed speed mode at waypoint B1 for the purpose of remaining optimized and making up a difference between the ETA and RTA at waypoint C, and then resume the ECON speed mode at waypoint C.

In the event that the aircraft is configured to accept entry of one or more new waypoints, the real-time adaptive speed scheduler can issue a speed schedule advisory that sustains the aircraft in the economy speed mode and at economy speed for a longer duration than was achieved by the advisory issued in the scenarios of FIGS. 3 and 4, yet still meet the ETA/RTA difference. As shown in FIG. 5, this can be accomplished by issuing a speed schedule advisory comprising the following instructions: (1) geospatial location of waypoint B1, (2) when the aircraft reaches waypoint B1, the aircraft should already be flying the speed schedule optimized to achieve the air speed of 428 knots; and (3) when the aircraft reaches waypoint C, the aircraft should revert to the ECON speed mode and ECON speed. The optimized speed is calculated based on the optimization parameters, aircraft information, current and forecasted weather, and the RTA trajectory distance separating waypoints B1 and C and the time difference between the ETA and the RTA that would have existed at waypoint C in the absence of this increase in air speed.

Comparing the solutions respectively shown in FIGS. 4 and 5, in the scenario of FIG. 4, the aircraft flies the optimized speed and speed mode from waypoint B to waypoint C to achieve an air speed of 420 knots, whereas in the scenario of FIG. 5, the aircraft flies from waypoint B to waypoint B1 at the economy speed of 400 knots in the ECON speed mode and then flies from waypoint B1 to waypoint C at an optimized speed and speed mode to achieve an airspeed of 428 knots. Determination of where to geospatially position waypoint B1 and determination of the speed mode and speed have been optimized to meet the RTA and achieve the optimization criteria. In both scenarios, the aircraft resumes the ECON speed mode and ECON speed at waypoint C. The result for the scenario in FIG. 4 is that the aircraft flies at an air speed of 420 knots over the distance between waypoints B and C, whereas the aircraft in the scenario of FIG. 5 flies at an air speed of 428 knots over a distance which is optimized, and is only a fraction of the distance between waypoints B and C, the other fraction of the distance between waypoints B and C being flown at the economy speed and in the ECON speed mode. The result is that the amount of fuel burned in the scenario shown in FIG. 4 will be greater than the amount burned in the scenario shown in FIG. 5, because the ECON speed mode is sustained for a longer duration and positing of waypoint B1 and calculated air speed is optimized to maximize efficiency.

Although the examples given in FIGS. 3-5 involve an increase in aircraft air speed in order to change the ETA to an RTA that is earlier, it should be appreciated that the aircraft air speed can be decreased in situations where the ETA is earlier than the RTA. Improving efficiency further, it should also be appreciated that the air speed can either be increased or decreased based on current and forecast weather situations where the ETA differs, by a configurable tolerance, from the RTA. For example, due to the current or forecasted weather, such as large tailwinds, the air speed may be decreased in situations where the ETA is earlier than the RTA.

In an environment or situation where the speed schedule advisory cannot be communicated via an aircraft datalink or other non-audio means (e.g., Internet messaging), the advisory must be given by voice. Using voice communication has its own unique limitations and characteristics. Examples of these limitations and conditions are the amount of current voice communication traffic and the communications delay (e.g., delay of the transmission, machine response and human and machine interface). The real-time adaptive speed scheduler considers these factors in the timing of the delivery of the speed schedule advisory to ensure it is executed at the appropriate time, event or geospatial point. In this voice environment, the real-time adaptive speed scheduler will also provide an additional advisory necessary to resume the economy speed mode. The person receiving the advisories, e.g., a dispatcher at an airline operations center, will send the voice commands based on the information included in those advisories by the automated real-time adaptive speed scheduler.

Figure 6:
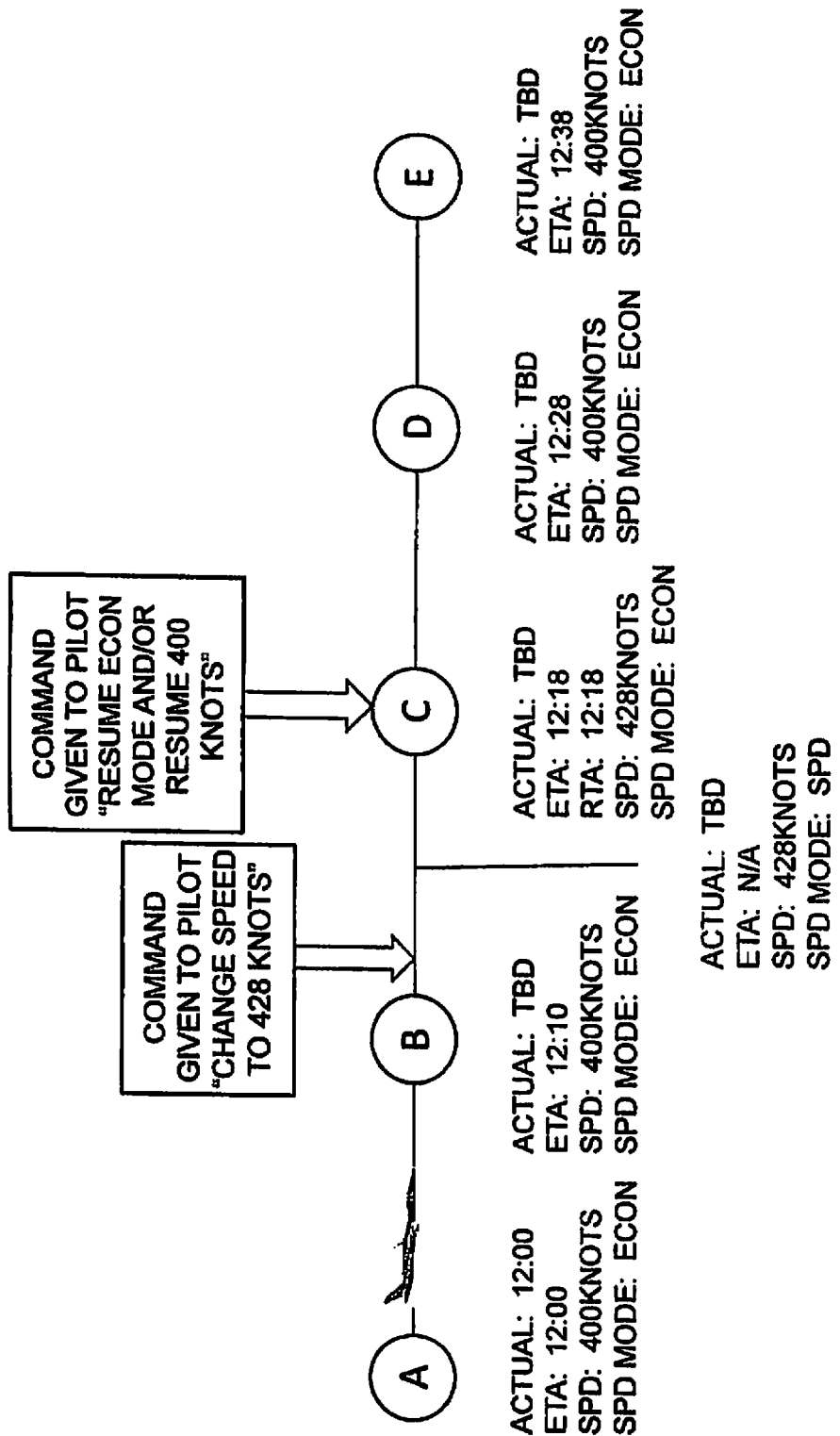
FIG. 6 is a diagram representing a speed schedule provided by a real-time adaptive speed scheduler in accordance with another embodiment in which the aircraft is instructed by voice commands to increase its air speed to 428 knots and adopt a speed schedule; wherein that speed schedule remains at ECON speed and in ECON speed mode for the longest extent possible, then transitions, at some position during transit from waypoint B to waypoint C, to a speed and speed mode to achieve the required arrival time, and then resumes the ECON speed mode at waypoint C.

FIG. 6 is a diagram representing a speed schedule provided by a real-time adaptive speed scheduler to a dispatcher at an airline operations center or any authorized subscriber. Based on the information in the speed schedule advisory, the dispatcher can send a voice command to a pilot of the aircraft to increase its speed to 428 knots realizing the flight crew will adopt the respective speed mode to achieve that instructed speed (at some position during transit from waypoint B to waypoint C) for the purpose of making up a difference between the ETA and RTA at waypoint C. Later that same dispatcher must issue a voice command telling the pilot to resume the ECON speed mode at waypoint C.

Figure 7:
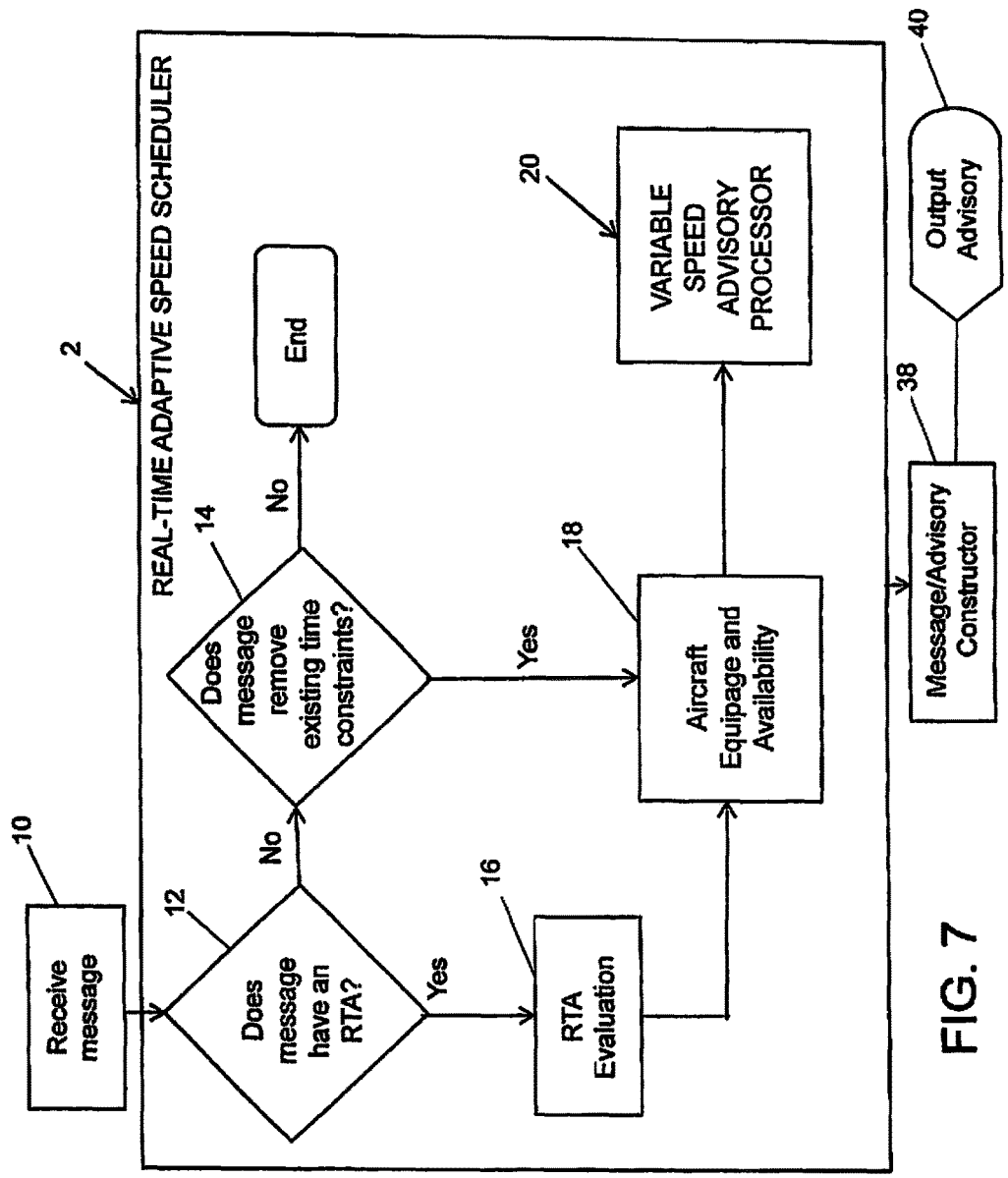
FIG. 7 is a flowchart showing steps performed by an exemplary example of a real-time adaptive speed scheduler in accordance with one embodiment.

One embodiment of a real-time adaptive speed scheduler is shown in FIG. 7. There are many advantageous ways to architect the real-time adaptive speed scheduler system. For example, the real-time adaptive speed scheduler system can comprise a stand-alone computer unit containing software and hardware within one physical box or casing or the system may comprise a software module executed by an air traffic control computer on the ground or a flight management computer onboard an aircraft. If the real-time adaptive speed scheduler is coupled with other systems that require datalink communications with an aircraft, the message constructor can be physically located outside the box but is still considered part of the real-time adaptive speed scheduler system.

The processing performed by the real-time adaptive speed scheduler starts when a message is received. This message may simply be a request to the real-time adaptive speed scheduler that an advisory be provided. The real-time adaptive speed scheduler then determines what data is needed to provide a solution and where that needed data is located. The real-time adaptive speed scheduler then creates connections to other systems (e.g., networks, ANSP ground systems, airline operations centers or directly with aircraft) to retrieve the needed data. After the needed data has been retrieved, the real-time adaptive speed scheduler can close the connections. The real-time adaptive speed scheduler can create connections, perform any required security authentication, close connections, and perform data retrieval dynamically and automatically. It also will allow a user to manually perform these tasks via a human interface. All of the retrieved data relating to an aircraft whose speed schedule is to be assessed is stored in memory units. In accordance with one embodiment, the real-time adaptive speed scheduler considers all relevant data, determines whether a speed schedule advisory should be constructed, and if so, calculates the speed schedule optimized along the flight trajectory for each RTA waypoint specified in the received message and, optionally, determines whether a new speed waypoint should be inserted in that sequence of waypoints and, if so, at what geospatial point.

Another possible implementation of the real-time adaptive speed scheduler is that the received message contains the request for an advisory for a particular aircraft and all needed information (e.g., aircraft performance data, RTAs, ETAs, weather conditions and flight parameters). This is the case depicted in FIG. 7. The processing starts when a message is received (step 10) concerning a particular aircraft that is currently following a flight trajectory comprising a sequence of waypoints. The current speed schedule data contained in the message is then evaluated to determine whether an RTA exists for any waypoint (step 12). If a determination is made in step 12 that the waypoint has an RTA value associated therewith, an RTA evaluation process is performed (step 16). During the RTA evaluation process, the real-time adaptive speed scheduler system evaluates the current ETAs, all controlled times of arrival, and all RTAs along the flight trajectory. The system also assesses the current and future speed and speed modes, to include the speed modes, but limited to economy, idle, speed, and hold along the flight trajectory. In particular, the speed scheduler compares each RTA value to the ETA value for the same waypoint to determine whether their values differ within a configurable tolerance (e.g. ±15 seconds). If the RTA and ETA values are within the configurable tolerance, then the real-time adaptive speed scheduler determines that the speed may not need to be modified, but the speed mode still needs to be evaluated. A condition when the RTA and the ETA values are not different and the speed and speed mode are to be altered is if the predictability of the ETA is not reliable. In this condition the speed scheduler accounts for the forecasted weather and future states of the air space environment and will calculate a new ETA value for comparison. The process then evaluates whether the speed mode needs to be modified (e.g., from SPD mode to ECON mode).

Following RTA evaluation, the speed scheduler determines the aircraft equipage, and the current and future equipage status and equipage availability (step 18). Equipage availability can be altered as each successive system utilizes the equipment. For example, multiple systems require and want access to the radio to transmit messages. Finally, availability can also pertain to a particular piece of equipment being limited from a geographic location of the aircraft. Status refers to the operational state of the equipment. In particular, the real-time adaptive speed scheduler then determines the aircraft's communication capability (e.g., the aircraft has a datalink capability).

ETAs may be provided from an authorized subscriber or system, or internally computed based on the source of the received message. For example, another ground system may require the real-time adaptive speed scheduler to use their calculated values of ETAs. In a case where ETAs are not provided or independent computation is desired, the real-time adaptive speed scheduler can calculate the ETAs in a known manner.

In the event that the system determines in step 12 that the message being processed does not have an RTA value associated therewith, the message would still be evaluated to determine whether the message indicates that existing time constraints need to be removed (step 14). If not, then the process ends for the received message and the next message is processed. If the message indicates that existing time constraints need to be removed, then the aircraft equipage and availability are assessed in the manner previously described (step 18).

These values and conditions (including aircraft performance data, weather conditions and flight parameters) are then passed to a variable speed advisory processor 20 for further processing. In particular, a datalink capability flag is set if the subject aircraft has a datalink capability, while a remove constraint flag is set if existing time constraints need to be removed.

The variable speed advisory processor may be a processor separate from the processor that performs steps 12, 14, 16 and 18, or a single computer or processor can be employed to execute the processes described herein in accordance with respective software modules.

Figure 8:
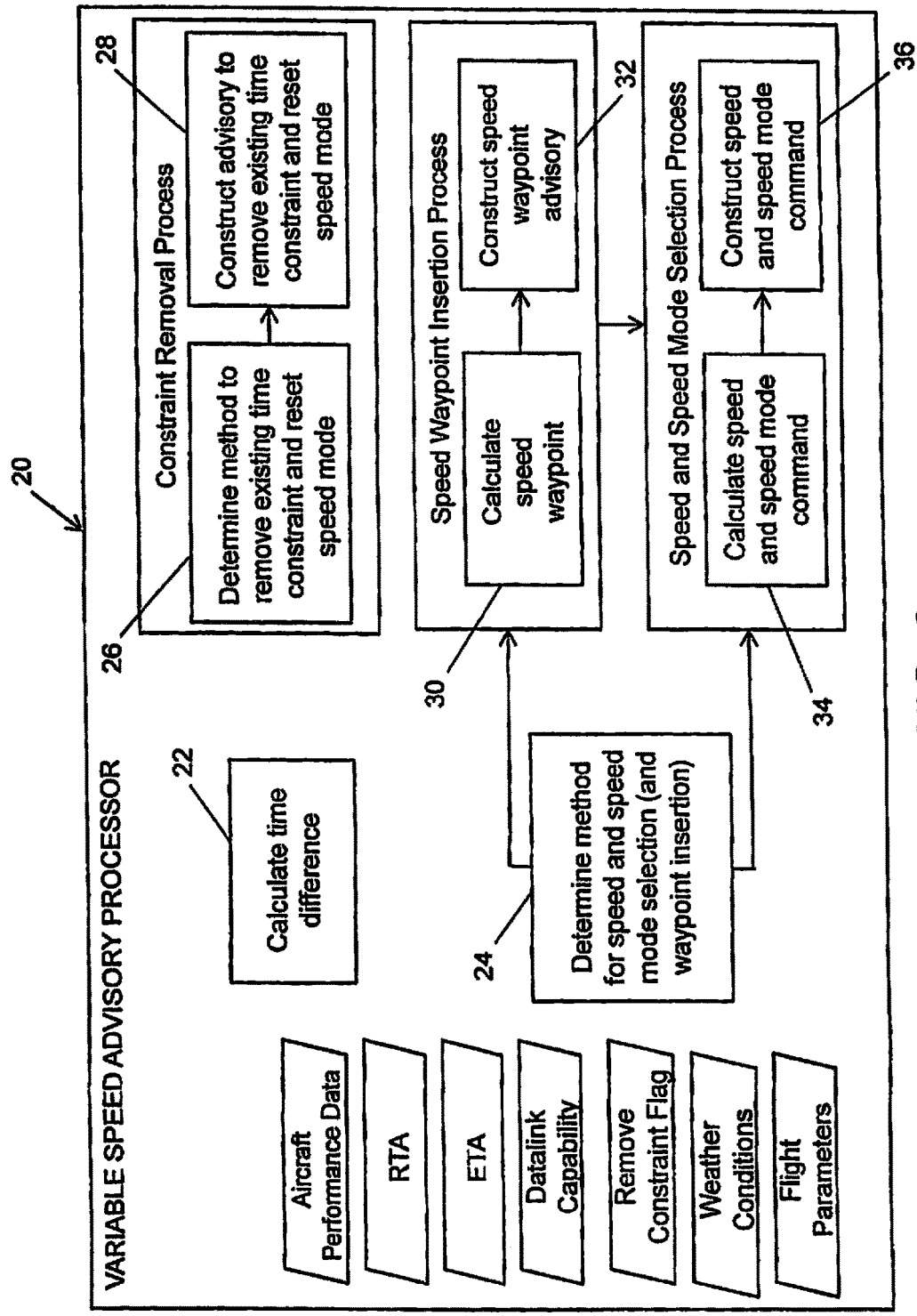
FIG. 8 is a block diagram showing stored data used by and processes performed by a variable speed advisory processor in accordance with one embodiment.

As shown in FIG. 8, the variable speed advisory processor 20 is programmed to perform at least the following processes: (1) calculate a respective time difference for each pair of RTA and ETA values associated with a respective waypoint (step 22); (2) determine a method for speed and speed mode selection and, optionally, a method for waypoint insertion (step 24); (3) calculate the optimized speed value and speed mode (step 34); (4) calculate an optimized location and name for speed waypoint to include in the advisory and determine the altitude, time or event to send the advisory compensating for communications delays and the future amount of air traffic communications in the applicable airspace (step 30); (5) determine a method for removing a previously instructed speed schedule advisory (step 26); and (6) package and make the speed schedule components available for the message constructor. Further processes may comprise one or more of the following: (a) constructing an advisory to remove existing time constraints and reset the speed mode (step 28); (b) constructing a speed waypoint insertion advisory (step 32); or (c) constructing a speed and speed mode command (step 36). All of the foregoing constructions can be combined into one speed schedule and delivered as one or more advisories. One or more of the foregoing processes may use the inputs of RTA, ETA, aircraft performance limitations, communications capability, remove constraint flag, weather conditions and flight parameters (e.g., current and future predictions of aircraft speed, altitude, configuration, phase of flight, geospatial position, fuel burn, gross weight).

In the event that it is determined that a component, e.g., speed, speed mode, or speed waypoint, of a previously instructed speed schedule needs to be removed, the variable speed advisory processor 20 will determine the method to be used to remove that existing speed advisory (see step 26 in FIG. 8). Examples of possible removal methods are, but not limited to, the following: an advisory to overwrite the previously instructed speed and speed mode to new values; an advisory which reverts the flight trajectory back to the economy speed mode; an advisory suggesting a flight plan update; or an advisory comprising components in a format applicable to the subscriber of the requested advisory.

The real-time adaptive speed scheduler system will calculate its own internal "predictions" of ETAs. This is done to verify that the controlled time of arrival or RTA is met through the proposed speed and speed mode. This happens in the speed and speed mode selection process in the variable speed advisory processor (not shown in FIG. 8.).

Referring back to FIG. 7, depending on how the real-time adaptive speed scheduler system is deployed in an operational environment, the variable speed advisory processor 20 will output the optimized speed schedule comprising speed, speed mode and/or speed waypoint components, in addition to timing to transmit the advisory, to a message constructor 38. The message constructor 38 compiles the components into the applicable message type for transmittal to the subscriber or intended recipient (step 40 in FIG. 7). A subscriber can request an advisory by means of a communications medium of one type and request that the requested advisory be transmitted by means of a communications medium of another type. For example, an airline operations center could request that a speed schedule advisory be transmitted to the flight management computer of an aircraft or to a mobile device, in addition to being transmitted to the airline operations center.

The output advisory may be in the format of a standard communication as an example, but not limited to datalink, internet protocol or any user-specified protocol. Various digital datalink systems for transmission of messages between aircraft and ground stations via radio or satellite are known, including the Aircraft Communications Addressing and Reporting System (ACARS). ACARS-equipped aircraft have an avionics computer called an ACARS Management Unit (MU), which is directly interfaced to a Control Display Unit (CDU) in the cockpit. There is a datalink interface between the ACARS MU and the FMS. Each airline has its own unique ACARS application operating on its aircraft. In addition, since each airline's computers are different, the content and format of messages sent by an AGARS MU differs for each airline.

The ACARS message may comprise a header containing an aircraft identifier, a payload containing the speed schedule advisory, and a cyclic redundancy check. The message is constructed in a user message format specified by the recipient of the message and in accordance with a dynamically settable user configuration stored in a subscriber database. This user configuration specifies which functions or processes are running in parallel, and also defines connections to receive and transmit the data. The user configuration also specifies the behavior of the application. The user message format generally pertains to the order and type of data and usually does not encompass the behavior of the application.

ACARS is a system for transmission of data messages between aircraft and ground stations via radio (VHF or HF) or satellite. ACARS messages are transmitted to and from aircraft before, during and after flights. For example, the aircraft sends in-flight reports on position, altitude, speed, outside temperature, wind, fuel, engine performance, etc over ACARS. The real-time adaptive speed scheduler automatically selects the communication means based on available links and avionics selection policies, which may take into consideration factors such as cost, performance and availability.

Other communication media, including the Aeronautical Telecommunications Network (ATN) or future satellite (e.g. Iridium NEXT) or terrestrial-based networks, may also be used.

In accordance with the foregoing teaching, the real-time adaptive speed scheduler can advise speed and speed mode instructions and suggest waypoints to optimize the use of speed control. This feature enables optimization for that flight. In contrast, the existing RTA function controls speed only during a specified time, introduces fuel inefficiency, and allows air speed to vary dynamically as groundspeed varies. Existing fixed speed solutions are speed instructions given by a controller to be executed "now". The fixed speed is not optimized, does instruct the speed and does not revert to the economy speed mode upon completion. The real-time adaptive speed scheduler disclosed herein overcomes the foregoing deficiencies by determining an optimized speed schedule to meet one or more required arrival times.

The system and method disclosed above provides improved flight efficiency (cost, fuel, and/or time) and aircraft predictability while maintaining the ability to meet a time constraint. By receiving an optimized speed schedule, an aircraft will remain at the economy speed in the economy speed mode for a maximum duration and capture the calculated optimized speed and speed mode. The real-time adaptive speed scheduler also utilizes data communications to reduce voice communications.

In summary, the real-time adaptive speed scheduler overcomes the following problems: (1) The speed scheduler advises speeds and speed modes to allow an aircraft to fly, meeting an RTA at a point in space. 2) The speed scheduler allows the flight to maximize the use of the economy (ECON) speed and the economy (ECON) speed mode and re-establishes the ECON speed mode having met a required arrival time. Depending on the situational conditions and aircraft equipage, utilization of the ECON speed and ECON speed mode can be further increased through the introduction of one or more speed waypoints. (3) The real-time adaptive speed scheduler overcomes the limitations that many aircraft do not have the RTA functionality, airlines or pilots are hesitant to fly the RTA function, and flying to a single RTA, or the RTA functionality is limited to specific flight phases. The speed scheduler can be used in all phases of flight and does not require that the aircraft be equipped with the RTA function. (4) Finally, the real-time adaptive speed scheduler introduces a method that can be applied in both a data and voice communication environment. This is particularly important in a mixed datalink equipage environment.

While the real-time adaptive speed scheduler has been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof.

As used herein, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

The invention claimed is:

1. A method for controlling a speed of an aircraft to conform to a speed schedule, comprising:
  (a) obtaining information concerning a flight trajectory of an aircraft, the information comprising a current location of the aircraft, a current speed schedule of the aircraft, flight parameters, aircraft performance data, and one or more economic constraints applicable to one or more economic constraint waypoints along the flight trajectory;
  (b) calculating estimated values for one or more economic factors in achieving an optimization criterion, the economic factors corresponding to the one or more economic constraints applicable to the one or more economic constraint waypoints along the flight trajectory;
  (c) calculating a respective difference between each economic constraint applicable to the one or more economic constraint waypoints and the respective estimated value for the corresponding economic factor;
  (e) responsive to a determination that a respective difference is greater than a configurable tolerance, adding a new economic constraint waypoint along the flight trajectory having a geospatial location with a corresponding economic constraint;
  (f) constructing a new speed schedule utilizing the new economic constraint waypoint and its corresponding economic constraint to eliminate or reduce the respective difference to be within the configurable tolerance;
  (g) transmitting a speed schedule advisory that comprises the new speed schedule to an aircraft having a flight management computer that is configured to accept entry of new economic constraint waypoints; and
  (h) controlling the aircraft to fly along a flight trajectory segment at speeds and in speed modes in accordance with the new speed schedule,
  wherein steps (a) through (f) are performed by a computer at a ground station.

2. The method as recited in claim 1, wherein said economic constraints comprise one or more or a combination of the following: a time constraint, a fuel constraint and a cost constraint.

3. The method as recited in claim 1, wherein said speed schedule advisory further comprises an instruction to revert to an economy speed mode following one of the economic constraint waypoints.

4. The method as recited in claim 1, wherein the new speed schedule is optimized to minimize one or more of cost, time and fuel.

5. The method as recited in claim 1, wherein said speed schedule advisory is communicated to said aircraft compliant with a protocol and data formats of at least one of internet protocol, user-specified protocol or datalink communication addressed to said aircraft.

6. The method as recited in claim 1, wherein the speed schedule advisory is transmitted to the aircraft in compliance with a protocol and data formats of at least one of internet protocol, user-specified protocol or datalink communication addressed to the aircraft.

7. A method for controlling a speed of an aircraft to conform to a speed schedule, comprising:
  obtaining or calculating information concerning at least one economic constraint trajectory segment of a flight trajectory stored in a flight management system of an aircraft that is flying in an economy speed mode, said information comprising a current location of said aircraft, a current speed schedule of said aircraft, flight parameters, aircraft performance data, current and forecast weather conditions along said flight trajectory, and one or more economic constraints applicable to a first economic constraint waypoint of said flight trajectory;
  for said first economic constraint waypoint, calculating estimated values for one or more economic factors corresponding to said one or more economic constraints applicable to said first economic constraint waypoint based on said information;
  calculating a respective difference between each economic constraint applicable to said first economic constraint waypoint and the respective estimated value for the corresponding economic factor;

determining whether the respective difference is greater than a configurable tolerance or not;

responsive to a determination that a respective difference is greater than a configurable tolerance, adding a second economic constraint waypoint not previously included in the flight trajectory and having a geospatial location with a corresponding economic constraint;

calculating speeds and determining speed modes of a new speed schedule to be flown by said aircraft along an economic constraint trajectory segment that starts at said second economic constraint waypoint and terminates at said first economic constraint waypoint, wherein said new speed schedule differs from said current speed schedule of said aircraft, and said speeds and speed modes of said new speed schedule are respectively calculated and determined to eliminate or reduce said respective differences within a configurable tolerance in accordance with user configuration data;

constructing a speed schedule advisory comprising an instruction for said aircraft to fly along said economic constraint trajectory segment at said calculated speeds and in said determined speed modes of said new speed schedule; and controlling the aircraft to fly along said economic constraint trajectory segment at said calculated speeds and in said determined speed modes of said new speed schedule.

8. The method as recited in claim 7, wherein said economic constraints comprise one or more or a combination of the following: a time constraint, a fuel constraint and a cost constraint.

9. The method as recited in claim 7, wherein said speed schedule advisory further comprises an instruction to revert to said economy speed mode following said first economic constraint waypoint.

10. The method as recited in claim 7, wherein said new speed schedule is optimized to minimize one or more of cost, time and fuel.

11. The method as recited in claim 7, wherein said speed schedule advisory is communicated to said aircraft compliant with a protocol and data formats of at least one of internet protocol, user-specified protocol or datalink communication addressed to said aircraft.

12. A system for constructing an advisory that includes an altered speed schedule that differs from a current speed schedule of an aircraft, said altered speed schedule comprising a combination of speeds and speed modes that will cause the aircraft to meet at least one economic constraint when the aircraft flies along a path, said system comprising a computer system programmed to perform the following operations:

obtain or calculate information concerning at least one economic constraint trajectory segment of a flight trajectory stored in a flight management system of an aircraft that is flying in an economy speed mode, said information comprising a current location of said aircraft, a current speed schedule of said aircraft, flight parameters, aircraft performance data, current and forecast weather conditions along said flight trajectory, and one or more economic constraints applicable to a first economic constraint waypoint of said flight trajectory;

for said first economic constraint waypoint, calculate estimated values for one or more economic factors corresponding to said one or more economic constraints applicable to said first economic constraint waypoint based on said information;

calculate a respective difference between each economic constraint applicable to said first economic constraint waypoint and the respective estimated value for the corresponding economic factor;

determine whether the respective difference is greater than a configurable tolerance or not;

responsive to a determination that a respective difference is greater than a configurable tolerance, add a second economic constraint waypoint not previously included in the flight trajectory and having a geospatial location with a corresponding economic constraint;

calculate speeds and determine speed modes of a new speed schedule to be flown by said aircraft along an economic constraint trajectory segment that starts at said second economic constraint waypoint and terminates at said first economic constraint waypoint, wherein said speeds and speed modes of said new speed schedule are respectively calculated and determined to eliminate or reduce said respective differences within a configurable tolerance in accordance with user configuration data;

construct a speed schedule advisory comprising an instruction for said aircraft to fly along said economic constraint trajectory segment at said calculated speeds and in said determined speed modes of said new speed schedule; and output said speed schedule advisory.

13. The system as recited in claim 12, wherein said economic constraints comprise one or more or a combination of the following: a time constraint, a fuel constraint and a cost constraint.

14. The system as recited in claim 12, wherein said speed schedule advisory further comprises an instruction to revert to said economy speed mode following said first economic constraint waypoint.

15. The system as recited in claim 12, further comprising means for transmitting said speed schedule advisory to said aircraft compliant with a protocol and data formats of at least one of internet protocol, user-specified protocol or datalink communication addressed to said aircraft.

* * * * *